United States Patent [19]

Fischer

[11] Patent Number: 5,403,058
[45] Date of Patent: Apr. 4, 1995

[54] CLOSURE MOUNTING SYSTEM

[75] Inventor: Douglas A. Fischer, Grand Rapids, Mich.

[73] Assignee: Prince Corporation, Holland, Mich.

[21] Appl. No.: 147,726

[22] Filed: Nov. 4, 1993

[51] Int. Cl.6 ............................................. B60R 7/04
[52] U.S. Cl. .................................. 296/37.7; 16/82; 188/290
[58] Field of Search ............... 296/37.7, 37.8, 37.12, 296/37.9; 16/82, 84, DIG. 9; 248/220.2, 225.1; 312/319.2; 188/290

[56] References Cited

U.S. PATENT DOCUMENTS

| 1,905,858 | 4/1933 | Eamilton . | |
|---|---|---|---|
| 2,815,528 | 12/1957 | Murray . | |
| 3,888,386 | 6/1975 | Svensson . | |
| 4,226,460 | 10/1980 | Schmidt et al. | 296/37.7 |
| 4,426,752 | 1/1984 | Nakayama | 16/82 |
| 4,468,836 | 9/1984 | Omata | 16/82 |
| 4,469,365 | 9/1984 | Marcus et al. | 296/37.7 |
| 4,595,228 | 6/1986 | Chu . | |
| 4,773,242 | 9/1988 | Smith | 16/82 X |
| 5,001,809 | 3/1991 | Kim et al. | 16/DIG. 9 X |
| 5,020,845 | 6/1991 | Falcoff et al. | 312/319.2 X |
| 5,035,389 | 7/1991 | Wang | 248/225.1 X |
| 5,050,922 | 9/1991 | Falcoff | 296/37.7 |
| 5,064,974 | 11/1991 | Vigneau et al. | 296/37.7 X |
| 5,138,116 | 8/1992 | Kabayama | 248/220.2 X |
| 5,211,267 | 5/1993 | Clark . | |
| 5,275,456 | 1/1994 | Ishii et al. | 312/319.2 X |

OTHER PUBLICATIONS

U.S. Patent application Ser. No. 08/051,165 filed on Apr. 22, 1993 and entitled Damping Device.

Primary Examiner—Joseph Pape
Attorney, Agent, or Firm—Price Heneveld Cooper DeWitt & Litton

[57] ABSTRACT

A damper is snap-fitted in a mounting socket formed adjacent a door frame to engage the door for controlling the movement of the door between closed and open positions. In the preferred embodiment of the invention, the socket includes a first pair of spaced legs engaging one side of the damper at opposite ends and a centrally located leg engaging the side of the damper opposite the one side. In a preferred embodiment of the invention, the central leg preferably includes an inwardly projecting lip which extends over the top of the damper which rests on a floor extending from the side of the door frame for holding the rotary damper vertically in place.

24 Claims, 3 Drawing Sheets

CLOSURE MOUNTING SYSTEM

BACKGROUND OF THE INVENTION

The present invention pertains to vehicle accessories and particularly to a system for controlling the movement of an accessory door between open and closed positions.

Vehicle overhead consoles have become an increasingly popular accessory in vehicles and may include a variety of features such as sunglass storage cases, garage door transmitter storage and actuation compartments, map lamps, electrical compasses and the like. Such consoles frequently have access covers or doors for enclosing interior storage compartments such as, for example, sunglass storage cases. In order to prevent the roof mounted horizontally extending doors from dropping downwardly quickly as they are opened, rotary damper mechanisms have been mounted to the door frames with engaging gears on the doors themselves to control their lowering motion so that the contents of the compartment do not disengage. Typically, such rotary dampers are employed and are heat staked to the door frame or attached by fastening screws which adds significant costs due to parts and/or labor for additional processing steps.

SUMMARY OF THE INVENTION

The system of one embodiment of the present invention provides an overhead console with a drop-down door having a damper which is snap-fitted in a mounting socket formed adjacent the door mounting aperture of the console to engage the door for controlling the movement of the door between closed and open positions. In the preferred embodiment of the invention, the socket includes a plurality of spaced resilient legs for engaging opposite sides and ends of the damper. In a preferred embodiment of the invention, the legs include first and second outer legs which include recess means which engage opposite ends of the damper to retain the damper, aligned between the legs. A central leg positioned between the outer legs preferably includes an inwardly projecting lip which extends over the top of the damper which also rests on a floor extending from the side of the door aperture for holding the rotary damper vertically in place.

By integrating this mounting structure within the frame of the door, which is molded of a resilient polymeric material, such as polycarbonate, a conventional rotary damper assembly can be snap-fitted and securely locked into position adjacent the hinge mounting for the door to position the gear of the rotary damper in engagement with an arcuate gear associated with the door for controlling the movement of the door. Such an arrangement provides, therefore, a snap-in secure mount for a rotary damper which can be integrally molded with the console door frame and allows easy assembly of a rotary damper thereto. These and other features, objects, and advantages of the present invention will become apparent upon reading the following description thereof together with reference to the accompanying drawings in which:

DETAILED DESCRIPTION OF THE PREFERRED EMBODIMENT

Figure 1:
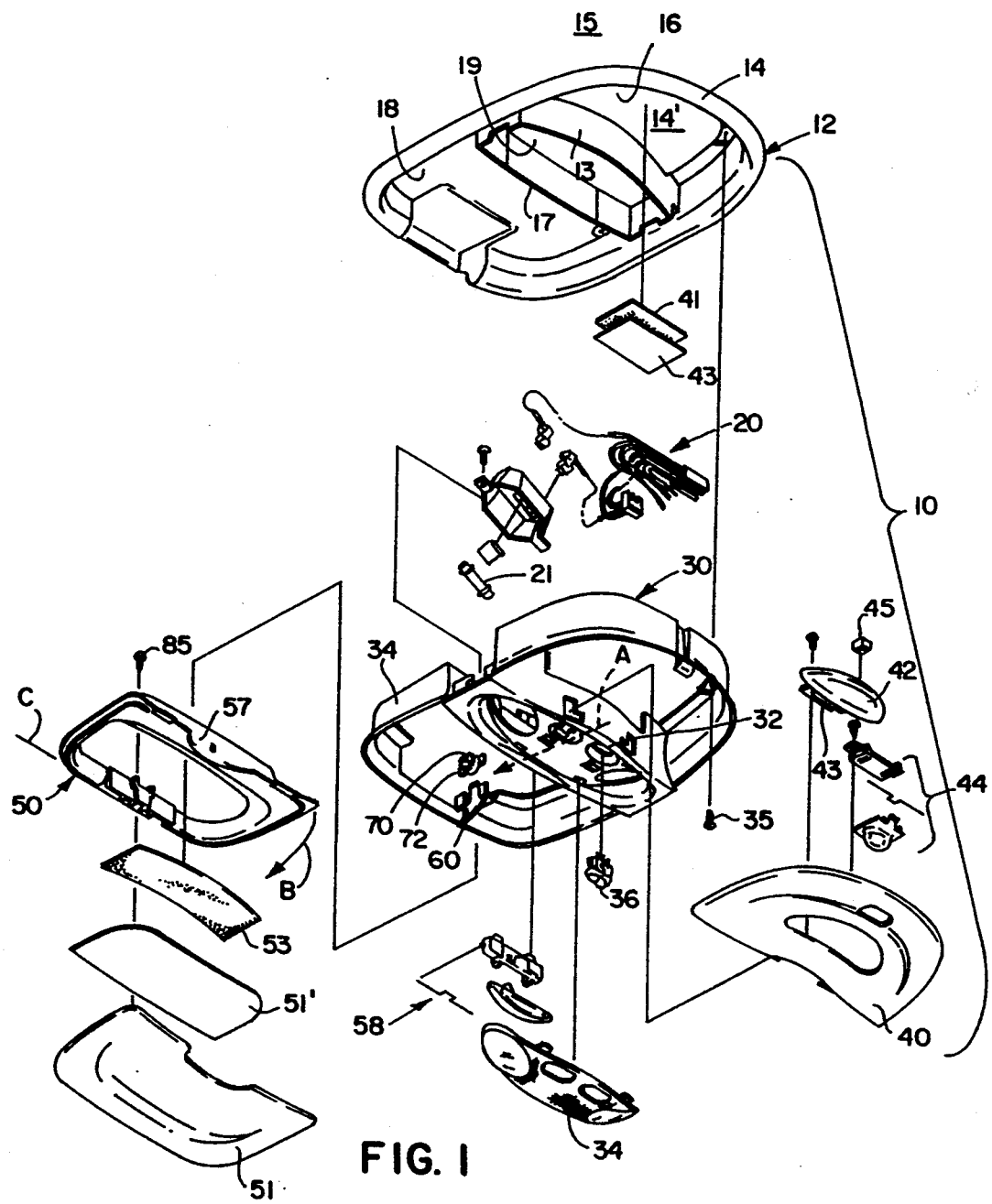
FIG. 1 is a fragmentary exploded perspective view of an overhead console mounted in a vehicle roof and including the present invention.

Referring initially to FIG. 1, there is shown a vehicle console 10 embodying the present invention and which includes a console housing 12 mounted within a recess in the roof of a vehicle such as an automobile. Housing 12 includes a trim bezel 14 extending over the edge of the recess and adjacent the headliner 15 of the vehicle. Typically, console 10 will be mounted along the centerline of the vehicle forward of the front seats such that a forward facing garage door transmitter storage compartment 16 and a sunglass storage compartment 18 will be accessible to the vehicle driver and/or passenger. The housing 12 includes these storage compartments and a center compartment 19 defined by a pair of spaced partitioning walls 17 and 13 for receiving a lamp assembly indicated generally at 20. Assembly 20 includes a pair of lamps 21 (one being shown with a similar lamp assembly on each side of compartment 19). A second housing 30 extends within housing 12 and includes a central bridge 32 for receiving a lens assembly 34 and a pair of switches 36 (one shown) for actuating the lamps 21 in the center of the console.

A garage door transmitter actuating door 40 of the type disclosed in U.S. Pat. No. 4,595,228 comprises a panel having a movable section 42 which moves through three positions for actuating a garage door transmitter (not shown) mounted to floor 14' of compartment 16 by Velcro pads 41,43. The first Velcro pad 41 is secured to the floor 14' of housing 12 and the mating Velcro pad 43 is attached to a conventional garage door opener to position its actuator button in alignment with panel section 42 which includes an actuator button 45 thereon for actuating the garage door opener on depression of panel section 42 associated with panel 40. Panel 40 is pivotally mounted to housing 30 by hinge 43 and a latch 44 through the compartment 16 through its mounting. The rear compartment 18 of console 10 is provided for storage of personal items such as sunglasses. Compartment 18 is defined in part by the peripheral wall 34 of housing 30 which extends around and within the edge of housing 12. Housing 30 is mounted to housing 12 by means of a plurality of fasteners, such as screws 35 at select locations for securing the unit to the vehicle roof once preassembled. Housing 30 includes a snap-in rotary damper mounting assembly or socket 60 described in greater detail below in connection with FIGS. 2–6 for receiving a conventional rotary damper 70, which includes a rotary gear member 12 which cooperates with a mating gear 52 (FIG. 2) on the sunglass storage door 50.

Figure 2:
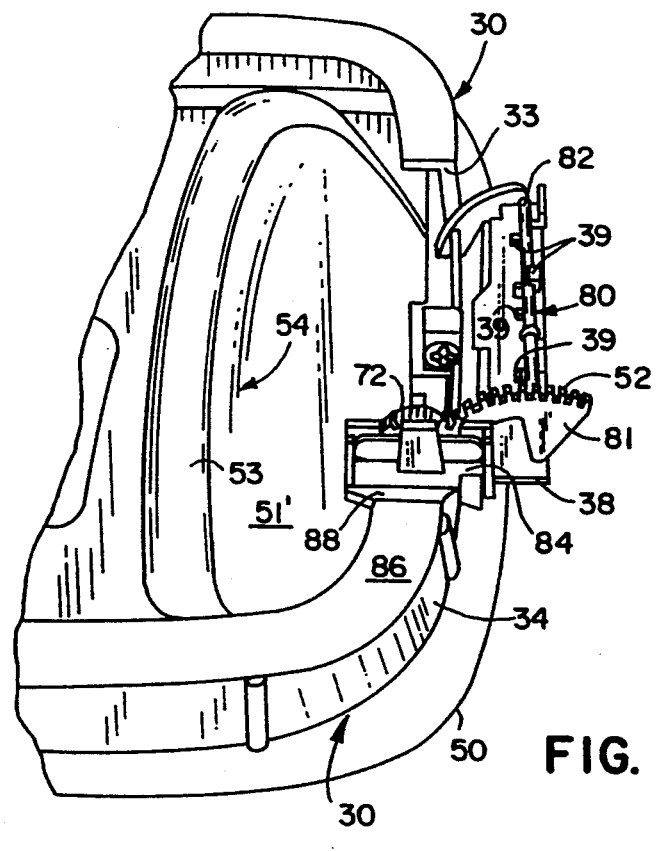
FIG. 2 is an enlarged fragmentary perspective view of a portion of the door mounting structure and door taken in a direction generally indicated by arrow A in FIG. 1.
Figure 3:
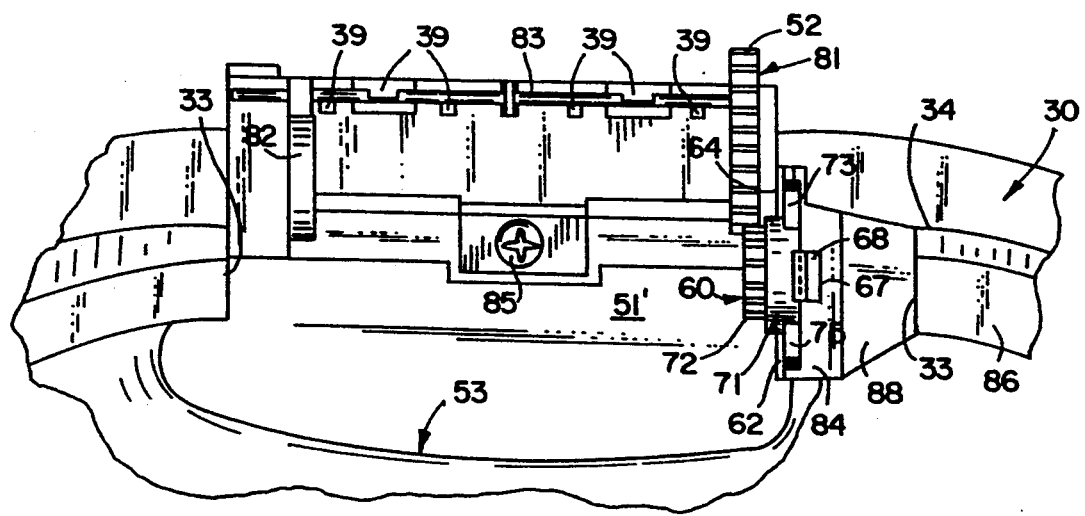
FIG. 3 is an enlarged fragmentary top plan view of the structure shown in FIG. 2.
Figure 5:
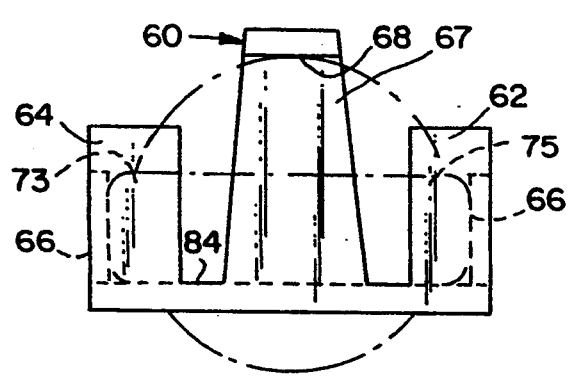
FIG. 5 is a front elevational view of the mounting socket 60 shown in FIG. 4 with the damper shown in phantom form.
Figure 6:
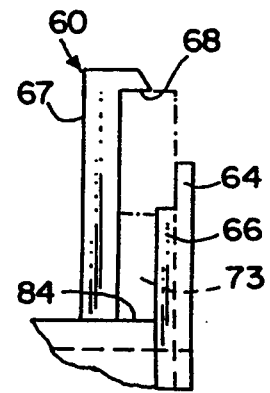
FIG. 6 is a left side elevational view of the structure shown in FIG. 5.

The sunglass storage door 50 includes a cover 51 and a sunglass storage ledge 53 which fits within the cover to define a pocket 54 as best seen in FIG. 2 for receiving sunglasses therein. Door 50 also includes hinge mechanism described below for pivotally mounted the door 50 to wall 34 for pivotal movement downwardly in the direction indicated by arrow B in FIG. 1 along the hinge axis C to open the sunglass storage case for access to the sunglasses held between cover 51 and panel 53. A cushioning pad 51' may be mounted to the inside of cover 51 to prevent damage to sunglasses stored therein. The sunglass storage door 50 is latched closed by a suitable latch assembly 58 which releases the forward edge 57 of door 50 allowing it to pivot downwardly under the control of rotary damper 70. Having briefly described the overall mechanism forming the console of the present invention, a detailed description of the mounting of the rotary damper 70 to housing 30 and its relationship to door 50 is now presented in connection with FIGS. 2–6.

Figure 4:
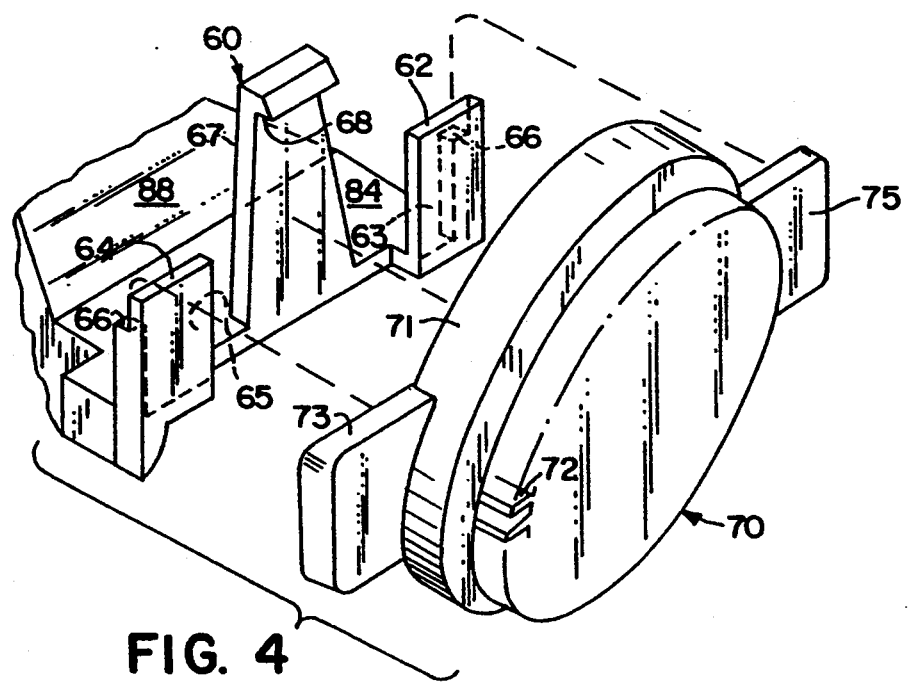
FIG. 4 is a greatly enlarged exploded perspective view of a portion of the rotary damper and mounting socket 60 shown in FIGS. 1–3.

The peripheral edge 34 of housing 30 includes a slot 33 in its rear facing edge for receiving the hinge mechanism 80 of door or cover 50. Edge 34 and slot 33 define together with ledge 86 (FIGS. 2 & 3) and walls 84 and 88 a frame for door 50. The hinge mechanism 80 includes a pair of arcuate arms 81 and 82 extending between the edges of slot 33 with arm 81 including gear teeth 52 at the outer periphery thereof which mesh with and engage gear teeth 72 on damper 70. Extending between the arcuate members 81 and 82 is a pivot rod 83 which is captively held to a pivot rod mounting flange 38 by means of a plurality of spaced snap-in alternately staggered mounting tabs 39. The hinge assembly 80 may be integrally formed with the cover 50 or attached to the cover by flange 38 extending horizontally from edge 34 utilizing a fastening screw 85 as shown. The pivot axle 83 and the radius of curvature of arcuate arm 81 are aligned such that the teeth 52 on arm 81 align with and mesh continuously with teeth 72 on the rotary damper assembly 70 which, as best seen in FIG. 4, includes a central body 71, a rearwardly extending mounting tab 73 extending from the central body 71, and a forwardly facing mounting tab 75 extending opposite tab 73 from the central body 71. Rotary damper 70 is of conventional construction and includes the rotary gear 72 having teeth around the periphery which mesh with teeth 52 with gear 72 being mounted on a pivot axle extending into the sealed central body 71 and communicating with a paddle wheel in a silicon fluid for viscous damping of the rotation of gear 72, which when coupled to gear 52 on arcuate arm 81 controls the pivoting motion of cover 50.

In order to snap mount the rotary damper 70 into the housing 30, an integrally molded polymeric socket 60 is provided. Socket 60 includes a pair of spaced first and second legs 62 and 64 respectively which are spaced a distance slightly greater than the width of mounting tabs 73 and 75 of rotary damper 70. On the side of legs 62 and 64 facing damper 70 there is formed a rectangular recesses 63 and 65 (FIG. 4) respectively defined in part by raised outer ledges 66 on each of the legs to captively engage the outer edges of mounting tabs 73 and 75 which fit within the recesses as best seen in FIGS. 2–5. The mounting socket 60 also includes a central leg 67 having a lip 68 which fits over the top of central body 71 of damper assembly 70 and holds the damper vertically between lip 68 and floor 84. The transverse spacing between the inner facing surfaces of legs 62 and 64, and leg 67 is substantially equal to the thickness of the tabs 73 and 75 such that the damper assembly 70 is snugly anchored and locked into position as best seen in FIGS. 2,3,5 and 6 by snap-fitting the damper assembly downwardly front the top of legs 62, 64, and 67 until lip 68 snaps over the central body 71 with the tabs 73 and 75 captively held within the recesses 63 and 65 of tile legs. Also, tile cylindrical body 71 of the central portion of the damper assembly engages the facing edges of legs 62 and 64 which also anchors the damper assembly in position once snap-fitted within the socket. Socket 60 is integrally formed with housing 30 and extends upwardly from a horizontally extending platform 84 which is coupled to the ledge 86 of the housing by means of a downwardly inclined ledge 88 to provide a rigid support base in connection also with the integral coupling with the sidewall 34 of housing 30 for the socket 60 defined by the three spaced apart and aligned legs. The bottom of tabs 73 and 75 rest on platform 84 and together with lip 68 of central leg 67 hold the damper 70 in a vertically locked-in position. The housing 30 including socket 60 can be molded of any suitable polymeric material such as polycarbonate.

This construction permits a conventional rotary damper assembly, such as assembly 70, to be snap-fitted to a door frame such as housing 30 for meshing with a correspondingly toothed gear 52 on an arcuate arm 81 associated with the door for controlling the opening and closing of the door in a manner to prevent spilling the contents of the horizontally mounted door which drops downwardly upon release of the latching mechanism 58. It will become apparent to those skilled in the art that various modifications to the preferred embodiment of the invention as described herein can be made without departing from the spirit or scope thereof as defined by the appended claims.

The embodiments of the invention in which an exclusive property or privilege is claimed are defined as follows.

1. A vehicle console including a drop down door comprising:
   a housing having a door frame defining a compartment therein;
   a door pivotally mounted to said door frame for movement between a position enclosing said compartment and an open position exposing the interior of said compartment;
   a socket mounted to said door frame adjacent said door and including a plurality of spaced resilient legs for snap receiving a rotary damper;
   a rotary damper mounted within said socket and including a rotary member having a viscous damping characteristic; and
   wherein said door includes an element engaging said rotary member of said rotary damper mechanism for controlling the motion of said door as it moves from a closed to an open position.

2. The console as defined in claim 1 wherein said resilient legs include a pair of outer legs positioned to engage one side of said rotary damper, and a central leg positioned between said outer legs to engage the opposite side of said rotary damper.

3. The console as defined in claim 2 wherein each of said outer legs includes a recess for captively receiving opposite ends of said damper.

4. The console as defined in claim 3 wherein said central leg includes a lip which extends over said rotary damper.

5. The console as defined in claim 4 wherein said socket further includes a floor opposite said lip for supporting said rotary damper between said floor and said lip.

6. The console as defined in claim 5 wherein said rotary member of said damper includes a gear and said element of said door includes a mating gear which engages said gear of said damper.

7. The console as defined in claim 6 wherein said socket is integrally molded of a polymeric material with said door frame.

8. A vehicle accessory comprising:
a door frame;
a door pivotally mounted to said door frame for movement between closed and open positions;
a socket mounted on said door frame adjacent said door for snap-in receiving and holding a rotary damper;
a damper mounted within said socket and including an element engaging said door for controlling the motion of said door at least as it moves from a closed to an open position.

9. The vehicle accessory as defined in claim 8 wherein said socket includes a plurality of resilient legs.

10. The vehicle accessory as defined in claim 9 wherein said resilient legs include a pair of outer legs positioned to engage one side of said damper, and a central leg positioned between said outer legs to engage the opposite side of said damper.

11. The vehicle accessory as defined in claim 10 wherein each of said outer legs includes a recess for captively receiving opposite ends of said damper.

12. The vehicle accessory as defined in claim 11 wherein said central leg includes a lip which extends over said damper.

13. The vehicle accessory as defined in claim 12 wherein said socket further includes a floor opposite said lip for supporting said damper between said floor and said lip.

14. The vehicle accessory as defined in claim 13 wherein said damper is a rotary damper having a central body and outwardly projecting mounting tabs extending in opposed relationship from said body, said damper including a rotary member engaging an element of said door.

15. The vehicle accessory as defined in claim 14 wherein said rotary member of said damper includes a gear and said element of said door includes a mating gear which engages said gear of said damper.

16. The vehicle accessory as defined in claim 15 wherein said socket is integrally molded of a polymeric material with said door frame.

17. An accessory for a vehicle comprising:
a door frame;
a door pivotally mounted to said door frame for movement between open and closed positions;
a socket mounted on said door frame adjacent said door and including a plurality of resilient legs for snap-in receiving and holding a rotary damper;
a rotary damper mounted within said socket and including a rotary member having a viscous damping characteristic said damper including a central discshaped body and outwardly extending mounting tabs; and
wherein said door includes an element engaging said rotary member of said rotary damper for controlling the motion of said door as it moves from a closed to an open position.

18. The accessory as defined in claim 17 wherein said resilient legs include a pair of outer spaced-apart legs each with a recess formed therein for nestably receiving a tab of said rotary damper.

19. The accessory as defined in claim 18 wherein said resilient legs further include a center leg positioned between said outer legs and including a lip which extends over said central body of said damper from a side of said damper opposite the engagement to said tabs wills said outer legs.

20. The accessory as defined in claim 19 wherein said socket further includes a floor from which at least said outer legs extend, said floor supporting at least an edge of said tabs opposite said lip of said central leg.

21. A mounting system for a rotary damper comprising:
a first member;
a second member movably mounted with respect to said first member;
a socket mounted on one of said first and second members, said socket including a plurality of resilient legs for snap-in receiving and holding a rotary damper;
a rotary damper mounted within said socket and including a rotary member having a viscous damping characteristic said damper including a central discshaped body and outwardly extending mounting tabs; and
wherein the other of said first and second members includes an element engaging said rotary member of said rotary damper for controlling the motion of said other of said first and second member.

22. The mounting system as defined in claim 21 wherein said resilient legs include a pair of outer spaced-apart legs each with a recess formed therein for nestably receiving a tab of said rotary damper.

23. The mounting system as defined in claim 22 wherein said resilient legs further include a center leg positioned between said outer legs and including a lip which extends over said central body of said damper from a side of said damper opposite the engagement to said tabs with said outer legs.

24. The mounting system as defined in claim 23 wherein said socket further includes a floor from which at least said outer legs extend,said floor supporting at least an edge of said tabs opposite said lip of said central leg.

* * * * *

UNITED STATES PATENT AND TRADEMARK OFFICE
CERTIFICATE OF CORRECTION

PATENT NO. : 5,403,058            page 1 of 2
DATED : April 4, 1995
INVENTOR(S) : Douglas A. Fischer It is certified that error appears in the above-indentified patent and that said Letters Patent is hereby corrected as shown below:

Column 2, line 64;

"member 12" should be --member 72--.

*Column 3, line 3;

"mounted" should be --mounting--.

*Column 3, line 57;

after "formed" delete --a--.

Column 4, line 6;

"tile" should be --the-- (first occurrence).

Column 4, line 6;

"tile" should be --the-- (second occurrence).

UNITED STATES PATENT AND TRADEMARK OFFICE
CERTIFICATE OF CORRECTION

PATENT NO. : 5,403,058
DATED : April 4, 1995
INVENTOR(S) : Douglas A. Fischer

It is certified that error appears in the above-indentified patent and that said Letters Patent is hereby corrected as shown below:

\*Column 5, line 16;

after "damper;" insert --and--.

Column 6, line 19;

"wills" should be --with--.

Signed and Sealed this

Third Day of October, 1995

*Attest:*

BRUCE LEHMAN

*Attesting Officer*     *Commissioner of Patents and Trademarks*